W. H. HAWORTH.
Wheel-Cultivator.
No. { 2,172, 33,176. }
Patented Aug. 27, 1861.
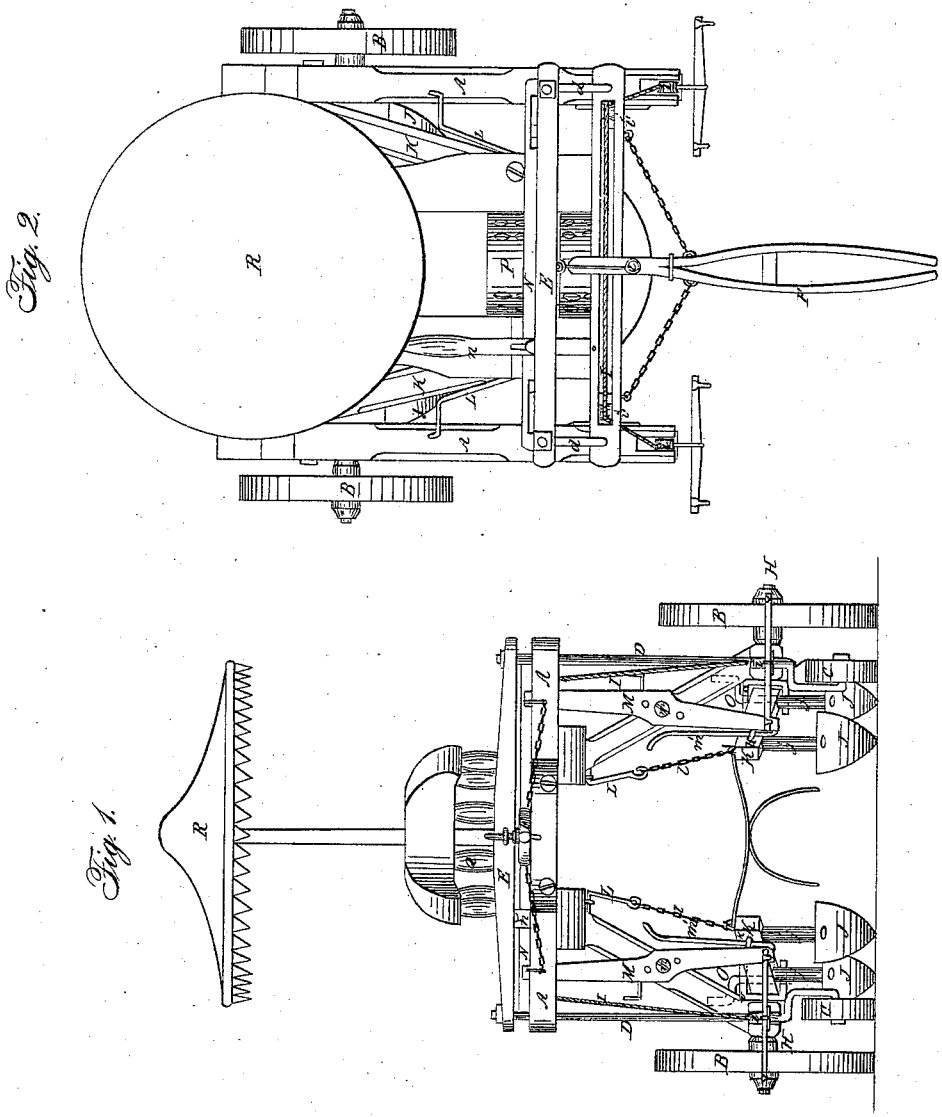
Witnesses:
Inventor:

UNITED STATES PATENT OFFICE.

WADE H. HAWORTH, OF TOWANDA, ILLINOIS.

IMPROVEMENT IN CULTIVATORS.

Specification forming part of Letters Patent No. 33,176, dated August 27, 1861.

*To all whom it may concern:*

Be it known that I, W. H. HAWORTH, of Towanda, in the county of McLean and State of Illinois, have invented certain new and useful Improvements in Cultivators; and I do hereby declare that the following is a full, clear, and exact description of the same, reference being had to the accompanying drawings, making part of this specification, in which—

Figure 1 is a front elevation, and Fig. 2 a top view, of a machine embodying my improvements.

Similar letters of reference indicate corresponding parts in both figures.

The subject of this invention is a four-wheeled machine intended chiefly for the cultivation of growing crops; and the invention particularly consists, first, in a device for guiding and turning a four-wheeled cultivator; second, in an improved combination of devices for governing the plows, as hereinafter more fully explained.

To enable others skilled in the art to make and use my invention, I will proceed to describe its construction and operation.

A A represent the frame of the machine, which is mainly supported on two wheels, B B, of sufficient size to enable the machine to pass easily over the surface of the ground.

C C are smaller wheels, supporting the front of the machine. The wheels C are journaled on the lower ends of vertical shafts D D, formed with cranks $d$ $d$ at top, the wrists of which are connected by a rod, E.

F is a tongue secured to the upper part of the frame by a pivot, $f$, and connected at back to the rod E.

G G are brace-chains serving to hold the tongue firmly in its central position. The tongue is divided longitudinally for a portion of its length and spread apart, as clearly shown in Fig. 2, in order to prevent the horses from stepping upon the young plants.

H H are whiffletrees attached one to each end of a cord, I, which passes beneath pulleys $i$ $i$ in the lower part of the frame and over pulleys $i'$ $i'$ above.

J J represent plow-shovels or cultivator-teeth, attached by standards $j$ $j$ to beams K K, which beams are at their front ends suspended by chains $l$ $l$ from horizontal levers L L, fulcrumed in the frame and extending backward, so that the plows may be raised by the feet of the driver.

M M are vertical levers fulcrumed at $m$ $m$ to the frame, and connected at their upper ends by a bar N, so as to be moved in either direction transversely of the machine by a hand-lever, $n$. The front ends of the beams K are connected to the lower ends of the levers M by eyes $k$ $k$, working on vertical rods $m'$ $m'$, so as to permit the free motion of the beams, but control them horizontally. The whole of the plows may thus be moved laterally, as occasion requires, by means of the hand-lever $n$. The rear ends of the beams K are furnished with suitable nuts and secured in position by vertical threaded rods O O, working in lugs $o$ $o$. By the rotation of the rods O the rear ends of the beams may be raised or lowered, as needful.

P is a perforated guard suspended from the beams K, for the purpose of protecting young plants from clods of earth.

Q is the driver's seat, and R a canopy to protect him from sun or rain.

To turn the machine the driver casts off one of the brace-chains G to allow the tongue to turn in the direction desired. This, acting through the connecting-rod E and crank-shafts D $d$, turns the wheels C, so that the machine may be brought round readily and within as contracted a space as a two-wheeled machine.

When it is desired to transport the machine from place to place, the chains $l$ are passed through their eyes upon the beams and drawn up and hitched upon the frame. By this means the plows are raised entirely clear of the ground.

The use of the wheels C preserves the machine from pitching and irregular motions, and prevents any undue pressure upon the backs or necks of the animals.

The low attachment of the whiffletrees secures lightness of draft, while by the height of the tongue and connecting parts the machine is adapted to work over the row after the plants have attained a considerable size. At this period the guard P is dispensed with.

The depth and pitch of the plows are regulated in the rear by the screw-shafts O, and in front by setting the fulcrum-pins $m$ in either holes in the levers M. By adjusting the upper ends of the levers M in the bar N the beams are set at any required distance apart.

What I claim as new, and desire to secure by Letters Patent, is—

1. The connecting-rod E and crank-shafts D d, employed in the manner explained to turn the wheels C on a vertical axis by the deflection of the tongue, as and for the purpose set forth.

2. The combination of the beams K K, levers L, M, and n, rods N, m', and O, and suspending-chains l, arranged and operating, substantially as and for the purposes explained, in connection with a four-wheeled cultivator.

WADE H. HAWORTH.

Witnesses:
OCTAVIUS KNIGHT,
L. W. BENDRIE.